US009731246B2

(12) United States Patent
Yokoyama et al.

(10) Patent No.: US 9,731,246 B2
(45) Date of Patent: Aug. 15, 2017

(54) EXHAUST GAS PURIFICATION DEVICE

(71) Applicant: YANMAR CO., LTD., Osaka (JP)

(72) Inventors: Tetsuya Yokoyama, Osaka (JP); Tsuyoshi Inoue, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/433,965

(22) PCT Filed: Oct. 3, 2013

(86) PCT No.: PCT/JP2013/076976
§ 371 (c)(1),
(2) Date: Apr. 7, 2015

(87) PCT Pub. No.: WO2014/057865
PCT Pub. Date: Apr. 17, 2014

(65) Prior Publication Data
US 2015/0258495 A1    Sep. 17, 2015

(30) Foreign Application Priority Data

Oct. 9, 2012    (JP) .................................. 2012-224133

(51) Int. Cl.
*B01D 53/94*    (2006.01)
*F01N 3/20*    (2006.01)
(Continued)

(52) U.S. Cl.
CPC ..... *B01D 53/9431* (2013.01); *B01D 53/9495* (2013.01); *F01N 3/2053* (2013.01);
(Continued)

(58) Field of Classification Search
USPC ......................................................... 422/176
See application file for complete search history.

(56) References Cited

U.S. PATENT DOCUMENTS 7,051,521 B2 * 5/2006 Funabashi ............. F01N 3/0814
422/170
2005/0000208 A1    1/2005 Liu

FOREIGN PATENT DOCUMENTS

JP    2-273515 A      11/1990
JP    02273515 A  *  11/1990
(Continued)

OTHER PUBLICATIONS

Abe-JP2003269149A-translated description, 2003.*
Yoshida et al. JP02273515A—(1990) translated document.*

*Primary Examiner* — Walter D Griffin
*Assistant Examiner* — Jelitza Perez
(74) *Attorney, Agent, or Firm* — Norris McLaughlin & Marcus, P.A.

(57) ABSTRACT

In an exhaust gas purification apparatus provided in an exhaust as path of an engine, it is an object of the present invention to shorten a pipe length of a bypass path bypassing a purification catalyst as short as possible, thereby reducing initial costs. The exhaust gas purification apparatus includes a purification casing in which at least the purification catalyst is accommodated. The purification catalyst purifies exhaust gas from the engine. The purification casing is integrally provided with the bypass path separately from the purification path in which the purification catalyst exists. The bypass path makes the exhaust gas bypasses the purification catalyst without passing through the purification catalyst.

8 Claims, 7 Drawing Sheets

(51) Int. Cl.
  *F01N 13/08*  (2010.01)
  *F01N 3/10*  (2006.01)
  *F01N 13/00*  (2010.01)

(52) U.S. Cl.
  CPC ......... *F01N 3/2066* (2013.01); *F01N 13/087* (2013.01); *F01N 3/106* (2013.01); *F01N 3/2093* (2013.01); *F01N 13/0097* (2014.06); *F01N 2390/00* (2013.01); *F01N 2410/00* (2013.01); *F01N 2570/18* (2013.01); *F01N 2590/02* (2013.01); *F01N 2610/02* (2013.01); *F01N 2610/06* (2013.01); *F01N 2610/146* (2013.01); *Y02T 10/24* (2013.01)

(56) References Cited

FOREIGN PATENT DOCUMENTS

| | | | |
|---|---|---|---|
| JP | 11-159321 | | 6/1999 |
| JP | 2003-269149 | | 9/2003 |
| JP | 2003269149 | A * | 9/2003 |
| JP | 2004-108311 | | 4/2004 |
| JP | 2006-341742 | | 12/2006 |
| JP | 2009-127500 | A | 6/2009 |
| JP | 2010-069999 | | 4/2010 |
| JP | 2010-071149 | | 4/2010 |

* cited by examiner

TO REDUCING AGENT SUPPLY DEVICE

TO ELECTRICITY GENERATOR CONTROL PANEL

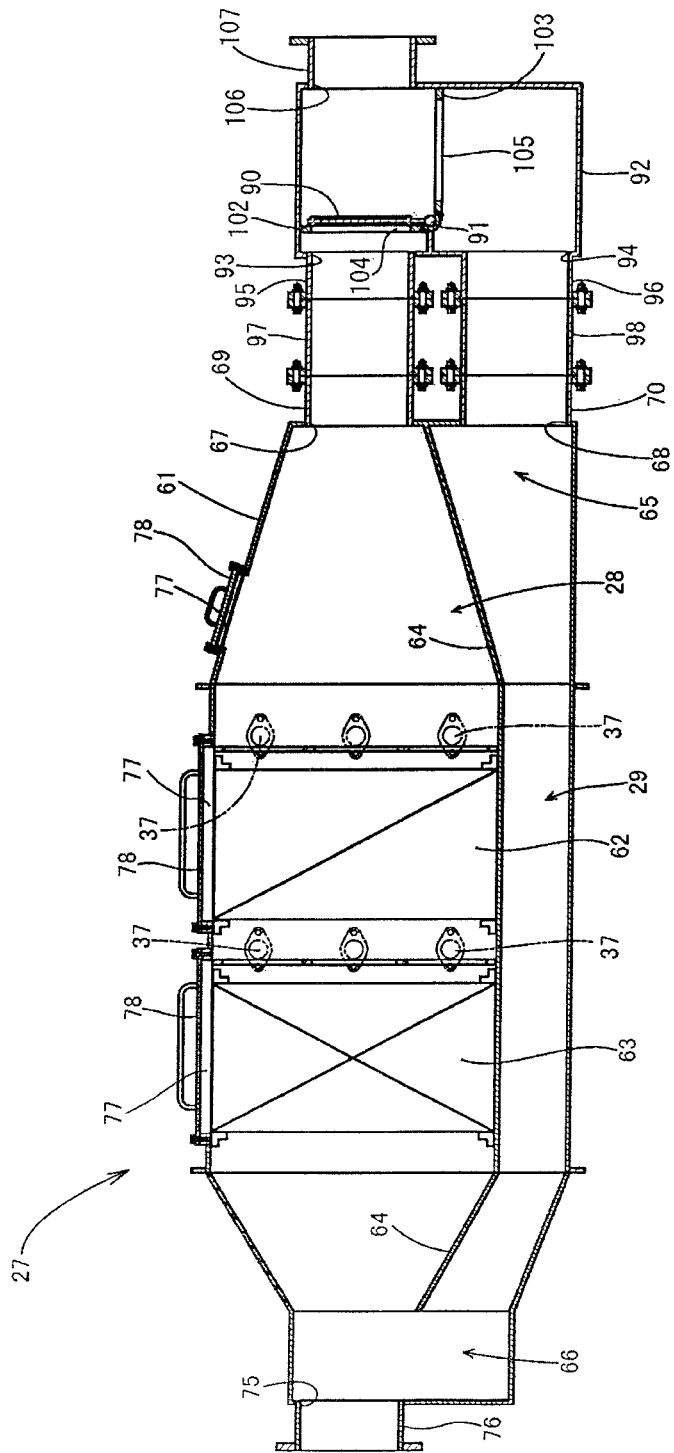

US 9,731,246 B2

EXHAUST GAS PURIFICATION DEVICE

TECHNICAL FIELD

The invention of the present application relates to an exhaust gas purification device for purifying exhaust gas in an internal combustion engine such as a diesel engine.

BACKGROUND OF THE INVENTION

Conventionally, in a vessel such as a tanker and a shipping boat, an electric power amount consumed by various kinds of auxiliary machines, cargo-handling devices, illumination, air conditioners and other devices is enormous, and to supply electric power to the electric systems, the vessel has a diesel electricity generator composed of a combination of a diesel engine and an electricity generator for generating electric power when the diesel engine is driven (see Patent Document 1 for example). It is known that the diesel engine is one of engines having the highest energy efficiency among the internal combustion engines, and an amount of $CO_2$ included in exhaust gas per unit output is small. Further, there is a merit that low quality fuel such as heavy oil can be used, and the diesel engine is also economically excellent.

In addition to $CO_2$, large amounts of nitrogen oxide, sulfur oxide and particulate materials are also included in exhaust gas of the diesel engine. These materials mainly come from heavy oil which is fuel, and are harmful materials which inhibit environmental preservation. Especially nitrogen oxide (NOx, hereinafter) is harmful for human body and is strong acidic, and it is also considered that the NOx is a cause of acid rain. Therefore, a machine which drives a diesel electricity generator such as a vessel discharges an extremely large amount of NOx, and it is interpreted as giving a heavy burden to a global environment.

As post-processing means for largely purifying NOx, a selective catalyst reduction method (SCR method, hereinafter) using urea as reducing agent is generalized. In the SCR method, there is used NOx catalyst of a honeycomb structure made of material supporting active ingredient such as V and Cr on oxide carrier such as Ti. If urea water as reducing agent aqueous solution is sprayed to an upstream of NOx catalyst, the urea water is hydrolyzed by heat of exhaust gas and ammonia is produced, the ammonia exerts action on NOx as reducing agent, and NOx is dissolved into harmless nitrogen and water.

CITATION LIST

Patent Document 1: Japanese Unexamined Patent Publication No. 2006-3401742

SUMMARY OF THE INVENTION

If consideration is given to global environment, it is necessary to remove NOx in exhaust gas as much as possible, and it is preferable to regulate NOx across the board irrespective of the high seas and territorial waters. However, under the circumstances, as higher exhaust gas regulation concerning diesel engines is applied, it is intended to provide regulated sea areas in terms of NOx. Since the NOx catalyst is of a honeycomb structure as described above, there is concern that at the NOx catalyst is clogged by soot and fine particles in exhaust gas. Further, performance of the NOx catalyst is deteriorated due to sulfur component in exhaust gas and product material coming from the sulfur component. To elongate life of the NOx catalyst as long as possible, to reduce running costs, and to reliably comply with the regulation in a regulated sea area, it is considered that the NOx catalyst is not exposed to exhaust gas under sail in a sea area other than the regulated sea area.

Hence, the applicant of the present application conventionally proposes that a purification casing for accommodating a NOx catalyst is provided in an exhaust gas path of an engine, and a bypass path branches off from an upstream location of the purification casing of the exhaust gas path without passing through the NOx catalyst. In this case, under sail in a regulated sea area, exhaust gas is sent toward the purification casing, and under sail in a sea area other than the regulated sea area, exhaust gas is sent toward the bypass path. According to this, there is a merit that it is possible to elongate life of the NOx catalyst, to reduce running costs, and to maintain purification performance for a long period of time.

According to the conventional structure, however, the bypass path which bypasses the NOx catalyst is provided separately from the exhaust gas path and the purification casing, and thus there is a problem that it is necessary to secure a long length of a pipe of the bypass path, and costs are increased. Further, an installation space for the bypass path must be secured separately from the purification casing, and when an engine room of a vessel or the like is narrow for example, there is concern that it is difficult to install the bypass path.

The above-described circumstances are studied, and it is an object of the invention of the present application to provide an improved exhaust gas purification device.

The invention provides an exhaust gas purification device provided in an exhaust gas path of an engine, wherein the exhaust gas purification device includes a purification casing in which at least a purification catalyst for purifying exhaust gas from the engine is accommodated, and the purification casing is integrally provided with a bypass path separately from a purification path having the purification catalyst, the bypass path makes exhaust gas bypasses the purification catalyst without passing through the purification catalyst.

According to the invention, in the exhaust gas purification device, the bypass path is provided in the purification casing.

According to the invention, in the exhaust gas purification device, a partition plate extending in a discharging direction of the exhaust gas partitions an interior of the purification casing into the purification path and the bypass path.

According to the invention, in the exhaust gas purification device, by partitioning the interior of the purification casing by the partition plate, the purification catalyst on a side of the purification path is warmed up using heat of the exhaust gas when the exhaust gas passes through the bypass path.

According to the invention, in the exhaust gas purification device, the purification path and the bypass path merge with each other in an outlet of the purification casing.

According to the invention, in the exhaust gas purification device, a branch portion between the purification path and the bypass path is provided with a path-switching member for switching the discharging direction of the exhaust gas between the purification path and the bypass path.

According to the invention, in the exhaust gas purification device, the path-switching member comprises switching valves respectively provided in an inlet side of the purification path and in an inlet side of the bypass path, and if one of the switching valves opens, the other switching valve closes.

According to the invention, in the exhaust gas purification device, both the switching valves are connected to each other in an interlocking manner through a link mechanism such that if one of the switching valves opens, the other switching valve closes, and a drive mechanism for an opening and closing operation is connected to one of the switching valves.

According to the invention, in the exhaust gas purification device, the path-switching member comprises a swing valve configured such that if the swing valve opens one of an inlet side of the purification path and an inlet side of the bypass path, the switching valve closes the other inlet side.

According to the invention, in the exhaust gas purification device, an injecting portion for spraying gas to the purification catalyst is provided on an upstream side of the purification catalyst in the purification casing.

According to the invention, in the exhaust gas purification device, injection of gas from the injecting portion is stopped when the exhaust gas passes through the bypass path.

According to the invention, in the exhaust gas purification device, the exhaust gas purification device further includes a reducing agent supply portion for supplying NOx-reducing agent to exhaust gas, and supply of the reducing agent from the reducing agent supply portion is stopped when the exhaust gas passes through the bypass path.

According to the invention, there is provided an exhaust gas purification device provided in an exhaust gas path of an engine, wherein the exhaust gas purification device includes a purification casing in which at least a purification catalyst for purifying exhaust gas from the engine is accommodated, and the purification casing is integrally provided with a bypass path separately from a purification path having the purification catalyst, the bypass path makes exhaust gas bypasses the purification catalyst without passing through the purification catalyst. Hence, when purification processing of exhaust gas is necessary (under sail in the regulated sea area), exhaust gas should be sent toward the purification path, and when the purification processing is unnecessary (under sail in a sea area other than the regulated sea area), exhaust gas should be sent toward the bypass path. Therefore, it is possible to efficiently purify exhaust gas and to elongate life of the purification catalyst.

Further, since the purification casing is integrally provided with the bypass path, it is possible to shorten a length of the pipe of the bypass path and to reduce the initial costs as compared with a case where the bypass path is separately provided outside the purification casing. Moreover, since the bypass path is incorporated in the purification casing, the exhaust gas purification device itself can be configured compactly, and the installation space of the exhaust gas purification device can be reduced. Hence, it becomes easy to install the exhaust gas purification device in a narrow engine room in a vessel or the like.

According to the invention, a partition plate extending in a discharging direction of the exhaust gas partitions an interior of the purification casing into the purification path and the bypass path. Therefore, two paths can be formed in the purification casing only by a simple configuration, i.e., only by adding the partition plate. Hence, it is possible to reduce the producing costs of the exhaust gas purification device.

According to the invention, by partitioning the interior of the purification casing by the partition plate, the purification catalyst on a side of the purification path is warmed up using heat of the exhaust gas when the exhaust gas passes through the bypass path. Hence, it is possible to always warm up the purification catalyst and to easily maintain the activated state irrespective of whether the exhaust gas should be purified.

According to the invention, the purification path and the bypass path merge with each other in an outlet of the purification casing. Hence, both exhaust gas which passes through the purification path and is purified and exhaust gas which passes through the bypass path can be sent toward the downstream of the exhaust gas path which is connected to the outlet of the purification casing. Therefore, it is possible to simplify the exhaust gas structure and to reduce the initial costs.

According to the invention, a branch portion between the purification path and the bypass path is provided with a path-switching member for switching the discharging direction of the exhaust gas between the purification path and the bypass path. Hence, when the purification processing of exhaust gas is necessary (e.g., under sail in the regulated sea area) and when the purification processing is unnecessary (e.g., under sail in a sea area other than the regulated sea area), a path through which exhaust gas passes can easily be selected. Therefore, it is possible to efficiently process exhaust gas in accordance with necessity and unnecessity of purification processing.

According to the invention, the path-switching member closes only one of the purification path and the bypass path, and both the purification path and bypass path are not closed at the same time. Hence, it is possible to reliably prevent the exhaust gas path from being completely closed, or to remarkably reduce the fear that the exhaust gas path is completely closed. According to the invention, both the switching valves are connected to each other in an interlocking manner through a link mechanism such that if one of the switching valves opens, the other switching valve closes, and a drive mechanism for an opening and closing operation is connected to one of the switching valves. Hence, it is possible to remarkably reduce the fear that the exhaust gas path is completely closed, and to open and close the two switching valves by the one drive mechanism, and a structure of the exhaust gas purification device can be simplified.

According to the invention, an injecting portion for spraying gas to the purification catalyst is provided on an upstream side of the purification catalyst in the purification casing. Hence, it is possible to forcibly remove soot and dust accumulated in the purification catalyst during usage by the operation of the injecting portion, and it is possible to enhance the maintenance operability and to elongate the life of the exhaust gas purification device.

According to the invention, injection of gas from the injecting portion is stopped when the exhaust gas passes through the bypass path. Hence, gas is not uselessly sprayed to the purification catalyst when the exhaust gas does not pass through the purification path. Therefore, a consumed amount of gas sprayed to the purification catalyst can be reduced, and the running costs can be reduced.

According to the invention, the exhaust gas purification device further includes a reducing agent supply portion for supplying NOx-reducing agent to exhaust gas, and supply of the reducing agent from the reducing agent supply portion is stopped when the exhaust gas passes through the bypass path. Hence, when the purification processing is unnecessary (e.g., under sail in a sea area other than the regulated sea area), the reducing agent is not uselessly consumed. It is possible to efficiently supply the reducing agent in accordance with necessity and unnecessity of purification processing.

BRIEF DESCRIPTION OF THE DRAWINGS

FIG. 7 is a sectional side view of a post-processing device in a third embodiment.

DESCRIPTION OF THE PREFERRED EMBODIMENTS

Embodiments in which the invention of the present application is embodied will be described based on the drawings (FIGS. 1 to 7) when the invention is applied to a diesel electricity generator mounted in a vessel.

(1). Brief Summary of Vessel

Figure 1:
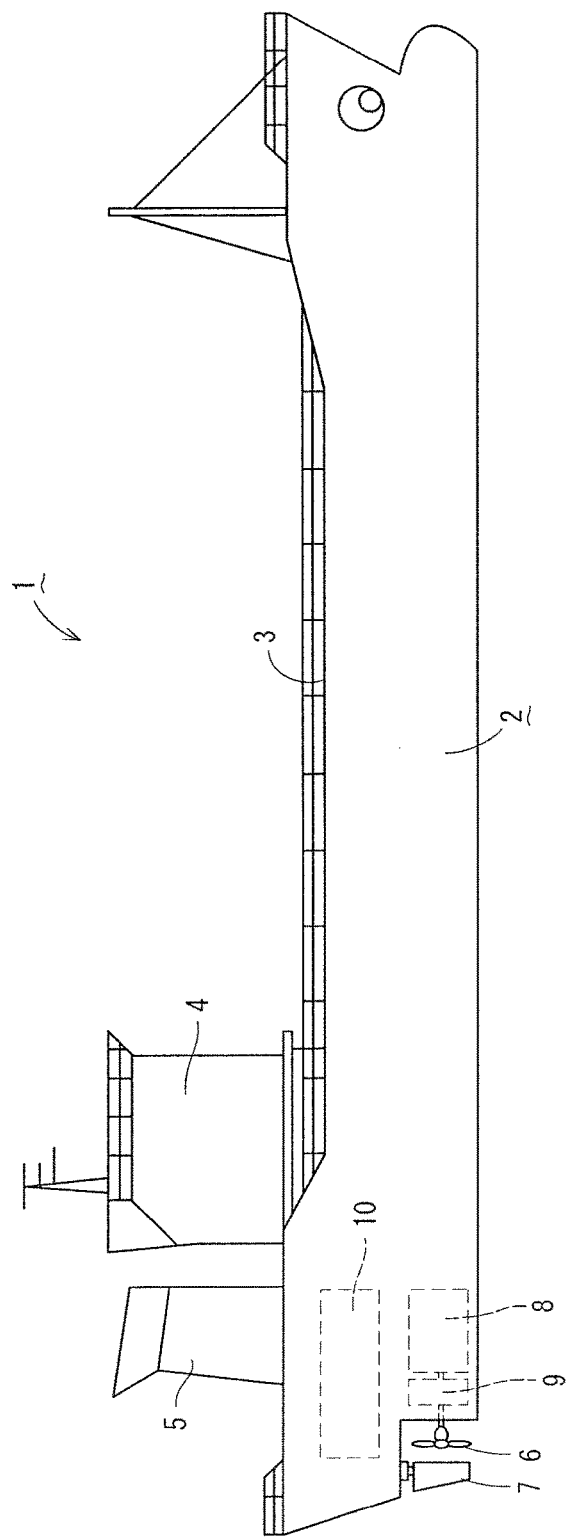
FIG. 1 is a side view of an entire vessel.

First, brief summary of a vessel 1 will be described with reference to FIG. 1. The vessel 1 of the first embodiment includes a vessel's body 2, a cabin 4 provided, on a rear portion on a deck 3 of the vessel's body 2, a funnel 5 placed on a rear portion of the cabin 4, and a propeller 6 and a helm 7 provided on rear lower portions of the vessel's body 2. Placed in an engine room located in a rear portion in the vessel's body 2 are a main engine 8 and a speed reducer 9 which are drive sources of the propeller 6, and an electricity generating device 10 for supplying electric power to an electric system in the vessel's body 2. The propeller 6 is rotated and driven by rotation power transmitted from the main engine 8 through the speed reducer 9.

(2). Structure of Electricity Generating Device

Figure 2:
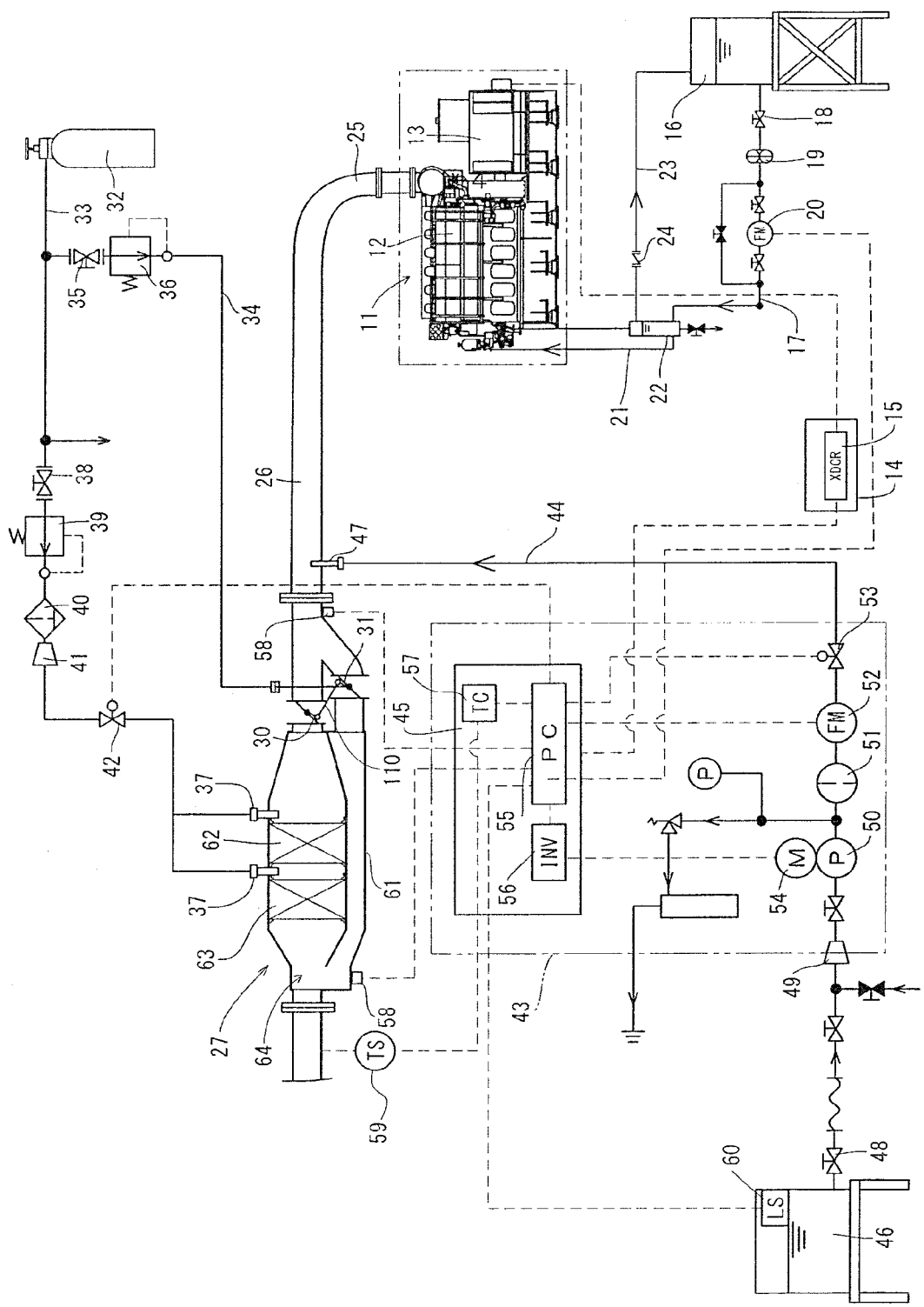
FIG. 2 is a schematic system diagram of an electricity generating device.

Next, a structure of the electricity generating device 10 will be described with reference to FIG. 2. The electricity generating device 10 includes a diesel electricity generator 11 composed of a combination of an electric generating diesel engine 12 (electric generating engine, hereinafter) and an electricity generator 13 which generates electricity by a driving operation of the electric generating engine 12. Electric power generated by the driving operation of the electricity generator 13 is supplied to an electric system in the vessel 2. The electricity generator 13 is electrically connected to an electric power transducer 15 in an electricity generator control panel 14. The electric power transducer 15 detects electric power generated by the electricity generator 13. Based on detection information of the electric power transducer 15, the driving operation of the electric generating engine 12 is controlled such that generated electric power matches with target electric power which is preset by the electricity generator control panel 14. The electric power transducer 15 is electrically connected also to a controller 55 of a later-described reducing agent supply device 43.

(3). Fuel System of Electricity Generating Device

Figure 3:
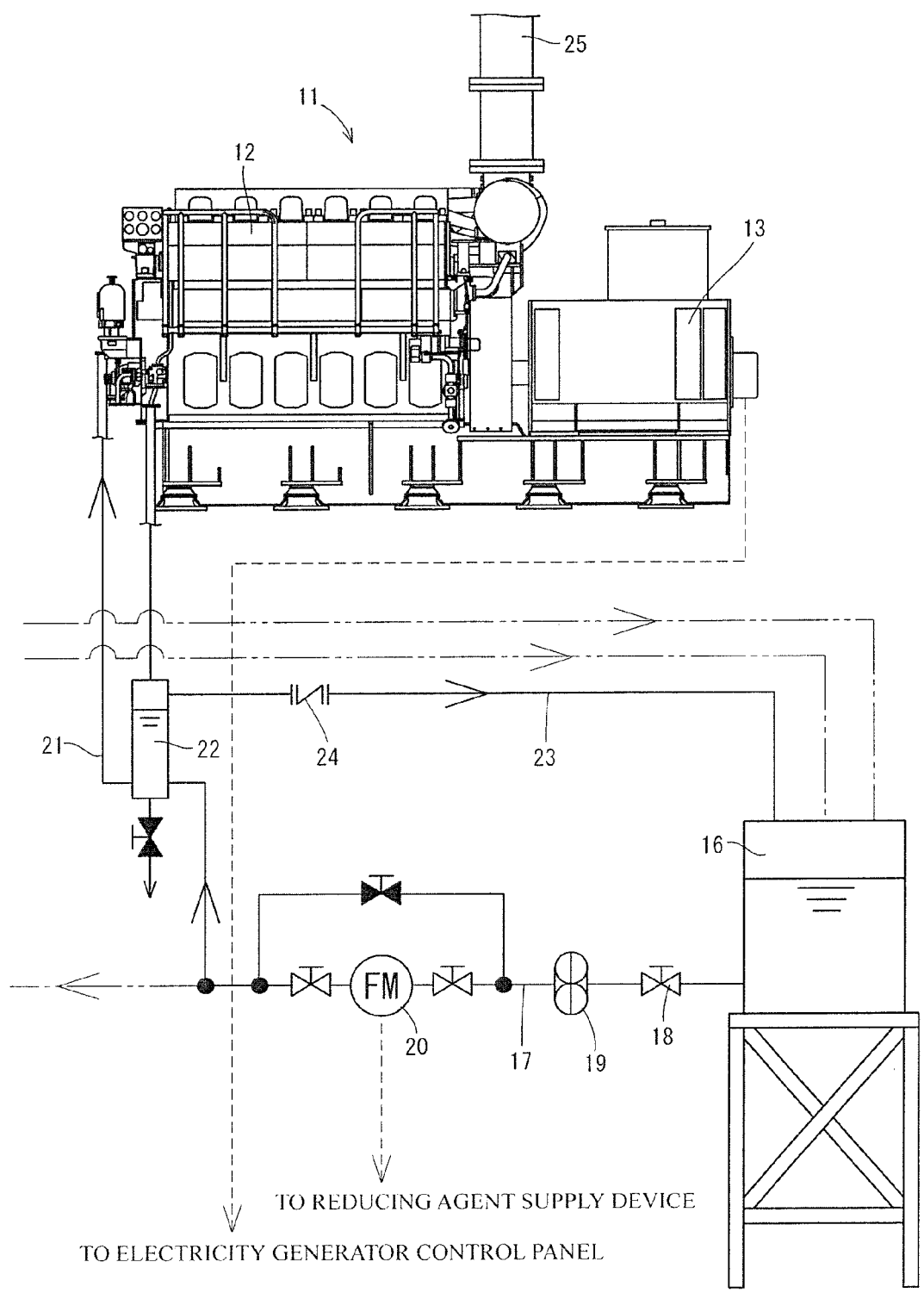
FIG. 3 is an explanatory diagram of a fuel system in the electricity generating device.

Next, a fuel system of the electricity generating device 10 will be described with reference to FIGS. 2 and 3. A fuel tank 16 in which fuel (heavy oil) of the electric generating engine 12 is stored is placed in the vessel's body 2. A supply pipe 17 is connected to the fuel tank 16. A fuel inlet valve 18, a fuel filter 19 and a fuel flow meter 20 are provided on an upstream of the supply pipe 17. The fuel flow meter 20 is electrically connected to the controller 55 of the later-described reducing agent supply device 43.

A sending pipe 21 extends from the supply pipe 17 at a location downstream from the fuel flow meter 20. The sending pipe 21 is connected to a fuel pump (not shown) of the electric generating engine 12. Fuel sent to the fuel pump 16 is injected, by a fuel injector (not shown) provided in the electric generating engine 12, into a combustion chamber (not shown) of each of cylinders in the electric generating engine 12.

A halfway portion of the sending pipe 21 is provided with a return chamber 22. A return pipe 23 extends from the fuel injector to outside of the electric generating engine 12. The return pipe 23 is connected to the fuel tank 16 through the return chamber 22. Therefore, extra fuel which is not used in the electric generating engine 12 is made to return to the fuel tank 16 through the return pipe 23. A check valve 24 is provided in the return pipe 23 at a location downstream from the return chamber 22.

(4). Air Intake and Exhaust System of Electricity Generator

Figure 4:
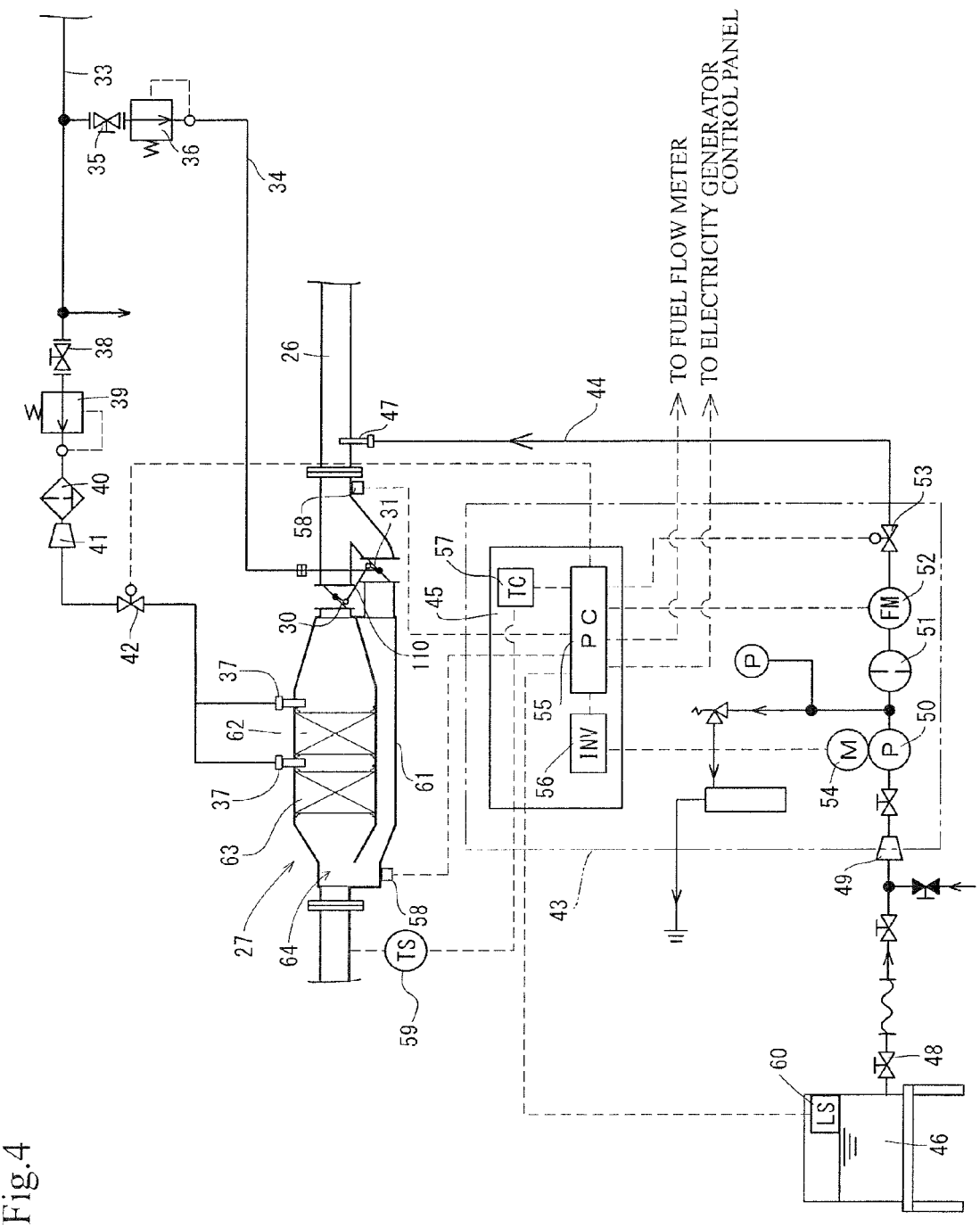
FIG. 4 is an explanatory diagram of an exhaust system of the electricity generating device and a reducing agent supply device.

Next, an air intake and exhaust system of the electricity generating device 10 will be described with reference to FIGS. 2 and 4. An air intake path (not shown) for sucking air and an exhaust gas path 25 for discharging exhaust gas are connected to the electric generating engine 12. Air sucked through the air intake path is sent into each of the cylinders (cylinders in suction stroke) of the electric generating engine 12. Fuel sucked from the fuel tank 16 is sent, under pressure, into the combustion chamber (auxiliary chamber) of each of the cylinders by the fuel injector when the compression stroke of each of the cylinders is completed. According to this, expansion stroke is carried out in each of the combustion chambers when auto ignition and combustion of air-fuel mixture are carried out.

The exhaust gas path 25 of the electric generating engine 12 extends to the funnel 5. A halfway portion of the exhaust gas path 25 is provided with a post-processing device 27 as an exhaust gas purification device which purifies exhaust gas. in exhaust stroke after expansion stroke, exhaust gas sent from the electric generating engine 12 to the exhaust gas path 25 is discharged to outside the vessel 1 through the post-processing device 27.

A NOx catalyst 62 and a slip processing catalyst 63 (they will be described in detail later) as purification catalysts are accommodated in the post-processing device 27 provided in the halfway portion of the exhaust gas path 25. The NOx catalyst 62 and the slip processing catalyst 63 are placed in the post-processing device 27 on the side of a purification path 28. The post-processing device 27 is integrally provided with a bypass path 29 separately from the purification path 28. The bypass path 29 makes exhaust gas bypasses the NOx catalyst 62 and the slip processing catalyst 63 without passing through the NOx catalyst 62 and the slip processing catalyst 63. Although it will be described in detail later, the bypass path 29 of the first embodiment is provided in the post-processing device 27. The purification path 28 and the bypass path 29 merge with each other at an outlet (downstream from slip processing catalyst 63) of the post-processing device 27. As the purification catalysts, only the NOx catalyst 62 may be used and the slip processing catalyst 63 may not be used.

The branch portion between the purification path 28 and the bypass path 29 are provided with a purification-side switching valve 30 and a bypass-side switching valve 31 as path-switching members which switches a discharging direction of exhaust gas between the purification path 28 and the bypass path 29. The purification-side switching valve 30 is provided on the side of an inlet of the purification path 28. The bypass-side switching valve 31 is provided on the side of an inlet of the bypass path 29.

The switching valves 30 and 31 are for selecting paths through which exhaust gas pass, and they have such a relation that if one of the valves 30 and 31 opens, the other valve closes. In a state where the purification-side switching valve 30 opens and the bypass-side switching valve 31 closes, exhaust gas in the exhaust gas path 25 passes through the NOx catalyst 62 and the slip processing catalyst 63 in the post-processing device 27, the exhaust gas is purified and then is discharged to outside of the vessel 1. In a state where the bypass-side switching valve 31 opens and the purification-side switching valve 30 closes, exhaust gas in the exhaust gas path 25 bypasses the NOx catalyst 62 and the slip processing catalyst 63 in the post-processing device 27 and the exhaust gas is discharged to outside of the vessel 1 without being purified.

One of the switching valves 30 and 31 is of a gas-operating type. In the first embodiment, a drive portion of the bypass-side switching valve 31 is connected to a gas main pipe 33 extending from a gas supply source 32 through a gas branch pipe 34. The gas supply source 32 of the first embodiment is for supplying air (or nitrogen gas) as compression gas to operate the switching valves 30 and 31. A halfway portion of the gas branch pipe 34 is provided with a gate valve 35 and a pressure reducing valve 36 from upstream in this order. Both the switching valves 30 and 31 are connected to each other through a link mechanism 110 in an interlocking manner. Therefore, if the bypass side switching valve 31 is opened or closed by air from the gas supply source 32, the purification-side switching valve 30 closes or opens through the link mechanism 110. The drive portion of the bypass-side switching valve 31, the gas main pipe 33, the gas branch pipe 34 and the gas supply source 32 correspond to opening and closing drive mechanisms.

An outlet of the gas main pipe 33 is connected to injection nozzles 37 as injecting portions provided on an upstream side of the NOx catalyst 62 and an upstream. side of the slip processing catalyst 63 in the post-processing device 27. The injection nozzles 37 inject compression gas from the gas supply source 32 toward the NOx catalyst 62 and the slip processing catalyst 63. By the operation of the injection nozzles 37, it is possible to forcibly remove soot and dust accumulated in the post-processing device 27 during usage.

A gate valve 38, the pressure reducing valve 39, an air filter 40, a reducer 41 and an injection solenoid valve 42 are provided from upstream in this order between the gas branch pipe 34 located most downstream of the gas main pipe 33 and both the injection nozzles 37. The injection solenoid valve 42 is electrically connected to the controller 55 of the later-described reducing agent supply device 43 so that the injection solenoid valve 42 opens and closes based on control information from the controller 55.

(5). Structure of Reducing Agent Supply Device

Next, a structure of the reducing agent supply device 43 will be described with reference to FIGS. 2 and 4. The reducing agent supply device 43 is for supplying NOx reducing agent to exhaust gas in the exhaust gas path 25, and includes a reducing agent supply passage 44 and a reducing agent control panel 45. One end of the reducing agent supply passage 44 is connected to a urea water tank 40 in which urea aqueous solution (urea water, hereinafter) as reducing agent is stored. The other end of the reducing agent supply passage 44 is connected to a urea water injection nozzle 47 as a reducing agent supply portion provided upstream from the branch portion between the purification path 28 and the bypass path 29 in the exhaust gas path 25. The urea water injection nozzle 47 may be provided downstream from the branch portion between the purification path and the bypass path. 29.

The reducing agent supply passage 44 is provided with a urea water inlet valve 48, a reducer 49, a feed pump 50, a urea water filter 51, a urea water flow meter 52, an injection solenoid valve 53 and the like in this order from the upstream side. The feed pump 50 pumps up urea water in the urea water tank 46 and discharges the urea water toward the urea water injection nozzle 47. An electric motor 54 is connected to the feed pump 50. By adjusting a rotation drive amount of the electric motor 54 based on control information sent from the later-described controller 55 through an inverter 56, a urea water supply amount from the feed pump 50 is adjusted. The injection solenoid valve 53 is electrically connected to the latex-described controller 55, and the injection solenoid valve 53 opens and closes based on control information from the controller 55. Urea water may be injected from the urea water injection nozzle 47 in an air assist manner. That is, urea water may be atomized by compression gas and may be injected from the urea water injection nozzle 47.

The reducing agent control panel 45 includes the controller 55 as control means, the inverter 56, a temperature adjuster 57 and pressure sensors 58 as clog-detection means for detecting a clog state of the post-processing device 27. The controller 55 mainly adjusts and controls reducing agent to operate the feed pump 50 and the injection solenoid valve 53 such that an appropriate amount of urea water suitable for concentration of NOx in exhaust gas is supplied to the exhaust gas path 25.

Although it is not illustrated in the drawings in detail, the controller 55 includes a ROM in which a control program and data are stored, a RAM in which a control program and data are temporarily stored, an input/output interface and the like in addition to a CPU for executing computation and control. The temperature sensor 59 is also electrically connected to the electric motor 54 through the inverter 56. A temperature sensor 59 which detects temperature of exhaust gas in the exhaust gas path 25 is electrically connected to the controller 55 through the temperature adjuster 57. The electric power transducer 15 of the electricity generator control panel 14, the fuel flow meter 20, the urea water flow meter 52, the pressure sensors 58, a urea water amount sensor 60 which detects a storing amount of urea water, the injection solenoid valve 42 and the injection solenoid valve 53 are also electrically connected to the controller 55.

The pressure sensors 58 as clog-detection means are respectively provided upstream and downstream of the post-processing device 27 of the exhaust gas path 25. In the first embodiment, the pressure sensors 58 are respectively provided upstream of the NOx catalyst 62 and downstream of the slip processing catalyst 63 in the post-processing device 27. A difference between detection values of both the pressure sensors 58, i.e., a pressure difference between upstream and downstream of the post-processing device 27 is obtained, and based on the pressure difference, an accumulation amount of soot and dust of the post-processing device 27 is converted. If the pressure difference becomes equal to or higher than a set value, the injection solenoid valve 42 opens by a command from the controller 55, the gas supply source 32 sends compression gas to both the injection nozzles 37, and the compression gas is sprayed from the injection nozzles 37 toward the NOx catalyst 62 and the slip processing catalyst 63.

Compression gas of the injection nozzle 37 may be injected at regular intervals (e.g., every 30 minutes) irrespective of the pressure difference. In this case, when exhaust gas in the exhaust gas path 25 passes through the bypass path 29, if injection of compression gas from the injection nozzle 37 is stopped, gas is not uselessly sprayed toward the NOx catalyst 62 and the slip processing catalyst 63 when exhaust gas does not pass through the purification path 28. Hence, a consumption amount of compression gas sprayed to the NOx catalyst 62 and the slip processing catalyst 63 can be reduced, and the running costs can be reduced.

It is also possible to employ such a configuration that the pressure sensor 58 is provided upstream of the NOx catalyst 62, pressure (reference pressure value) upstream of the NOx catalyst 62 in a new state where soot and dust are not accumulated in the post-processing device 27 is previously stored in the ROM or the like in the controller 55, current pressure at the same measured location is detected by the pressure sensor 58, a pressure difference between the reference pressure value and a detection value of the pressure sensor 58 is obtained, and the accumulated amount of soot and dust of the post-processing device 27 is converted based on the pressure difference.

The temperature sensor 59 which detects exhaust gas temperature in the exhaust gas path 25 is provided downstream of the post-processing device 27 of the exhaust gas path 25. In the first embodiment, if the detected temperature of the temperature sensor 59 becomes equal to or higher than predetermined, path temperature (e.g., 305°C., the injection solenoid valve 53 opens by a command from the controller 55, urea water is sent from the urea water tank 46 to the urea water injection nozzle 47 by the driving operation of the feed pump 50, and the urea water is injected from the urea water injection nozzle 47 into the exhaust gas path 25. The urea water amount sensor 60 which detects a stored amount of urea water is of a float type, and placed in the urea water tank 46. In this case, the stored amount of urea water in the urea water tank 46 is detected based on variation of a vertical height position of the urea water amount sensor 60.

The controller 55 adjusts a rotation drive amount of the electric motor 54 through the inverter 56 based on a generated electric power amount which is detected by the electric power transducer 15, and a urea water supply amount from the feed pump 50 is adjusted. This is because there is a correlation between concentration of NOx in exhaust gas and a generated electric power amount (this may be output (or load) of electric generating engine 12) of the diesel electricity generator 11. Therefore, a urea water supply amount (reducing agent supply amount) which is required for reducing NOx is proportional to the generated electric power amount, i.e., concentration of NOx in exhaust gas. Although it is not illustrated in the drawings, a relation between the urea water supply amount which is required for reducing NOx and the generated electric power amount is previously stored in the controller 55 (e.g., ROM or the like) in a MAP format or in a function table manner.

The controller 55 obtains the urea water supply amount which is required for reducing NOx from the generated electric power amount detected by the electric power transducer 15 and the MAP or the function table which is previously stored in the controller 55, the controller 55 rotates and drives the, electric motor 54 such that the obtained supply amount of urea water is injected from the urea water injection nozzle 47 within appropriate time, to adjusts an operation amount of the feed pump 50.

The electric power transducer 15 corresponds to NOx detecting means. That is, the electric power transducer 15 detects the generated electric power amount of the electricity generator 13, and the concentration of NOx in exhaust gas is indirectly calculated based on a detection result of the electric power transducer 15. The NOx detecting means is not limited to the electric power transducer 15, and the NOx detecting means may detect output of the electric generating engine 12 or may detect a load of the electric generating engine 12 from a fuel injection amount. Alternatively, the NOx detecting means may directly detect the concentration of NOx in exhaust gas. In addition to control of rotation of the motor performed by the inverter, it is possible to circulate urea water while keeping the number or rotation constant, and to control an injection amount of urea water by an adjusting valve.

(6). Structure of Post-Processing Device

Next, a structure of the post-processing device 27 will be described with reference to FIGS. 2, 4 and 5. The post-processing device 27 has a square tube-shaped purification casing 61 made of heat resistant metal material. The NOx catalyst 62 which facilitates reduction of NOx in exhaust gas, and the slip processing catalyst 63 which facilitates oxidation treatment of excessively supplied reducing agent (ammonia after hydrolysis in first embodiment) are arranged in series in this order from the upstream side and accommodated in the purification casing 61. Each of the catalysts 62 and 63 is of the honeycomb structure formed from a large number of cells which are partitioned by porous (filterable) partition walls, and the catalyst has catalyst metal such as alumina, zirconia, vanadia/titania or zeolite.

The NOx catalyst 62 uses, as reducing agent, ammonia produced by hydrolysis of urea water from the urea water injection nozzle 47, and selectively reduces NOx in exhaust gas, thereby purifying exhaust gas sent into the post-processing device 27. The slip processing catalyst 63 oxidizes unreacted (excessive) ammonia which flows out from the NOx catalyst 62, and changes the ammonia into harmless nitrogen. In this case, the following reaction formulae are produced in the purification casing 61:

$(NH_2)_2CO + H_2O \rightarrow 2NH_3 + CO_2)$ (hydrolyzed)

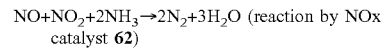
$NO + NO_2 + 2NH_3 \rightarrow 2N_2 + 3H_2O$ (reaction by NOx catalyst 62)

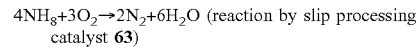
$4NH_3 + 3O_2 \rightarrow 2N_2 + 6H_2O$ (reaction by slip processing catalyst 63)

The purification path 28 accommodating the NOx catalyst 62 and the slip processing catalyst 63 is formed in the purification casing 61. The purification casing 61 is integrally provided with the bypass path 29. In the first embodiment, the bypass path 29 is provided in the purification casing 61. That is, a partition plate 64 extending in a discharging direction of exhaust gas is mounted in the purification casing 61. The partition plate 64 partitions an interior of the purification casing 61 into the purification path 28 and the bypass path 29. By partitioning the interior of the purification casing 61 by the partition plate 64, it is possible to warm up the NOx catalyst 62 and the slip processing catalyst 63 on the side of the purification path 28 using heat of exhaust gas when exhaust gas passes through the bypass path 29. Hence, it is possible to always warm up the NOx catalyst 62 and the slip processing catalyst 63 and to easily maintain an activated state irrespective whether exhaust gas should be purified. Since the warming up operation is unnecessary when exhaust gas passes through the purification path 28, it is possible to swiftly purify exhaust gas.

Figure 5:
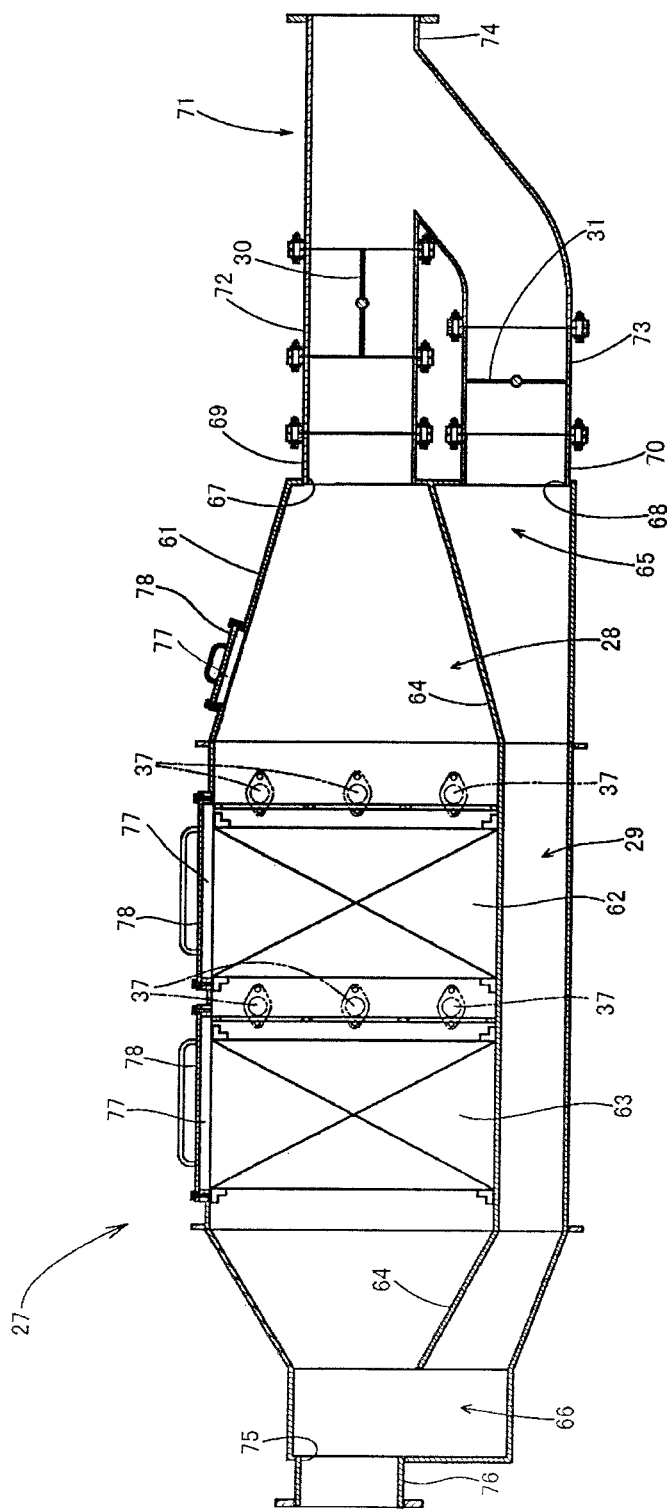
FIG. 5 is a sectional side view of a post-processing device in a first embodiment.

As shown in FIG. 5, an upstream end of the partition plate 64 is in intimate contact, in a butting manner, with a front inner surface of an inlet 65 located upstream of the NOx catalyst 62 of the purification casing 61. Meanwhile, a downstream end of the partition plate 64 discontinues in an outlet 66 located downstream of the slip processing catalyst 63 of the purification casing 61. Hence, the purification path 28 and the bypass path 29 merge with each other in the outlet 66 of the purification casing 61.

On a front surface of the inlet 65 of the purification casing 61, a first exhaust gas inlet 67 is formed. close to the purification path 28, and a second exhaust as inlet 68 is formed close to the bypass path 29. A front outer surface of the inlet 65 is provided with a purification-side intake pipe 69 which is in communication with the first exhaust gas inlet 67 and a bypass-side intake pipe 70 which is in communication with the second exhaust gas inlet 68. The purification-side intake pipe 69 and the bypass-side intake pipe 70 are connected to a bifurcated pipe 71. The purification-side intake pipe 69 is fastened to a purification-side outlet 72 of the bifurcated pipe 71 through a flange, and the bypass-side intake pipe 70 is fastened to a bypass-side outlet 73 of the bifurcated pipe 71 through a flange.

An inlet 74 of the bifurcated pipe 71 is connected to an upstream side of the exhaust gas path 25 through a flange. The bifurcated pipe 71 corresponds to the branch portion between the purification path 28 and the bypass path 29. The purification-side switching valve 30 is provided in the purification-side outlet 72 of the bifurcated pipe 71 which abuts against the inlet of the purification path 28. The bypass-side switching valve 31 is provided in the bypass-side outlet 73 of the bifurcated pipe 71 which abuts against the inlet of the bypass path 29.

A discharge port 75 is formed in a rear surface of the outlet 66 of the purification casing 61 close to the purification path 28. An exhaust gas discharge pipe 76 which is in communication with the discharge port 75 is provided in an outer surface of a rear portion of the outlet 66. The exhaust gas discharge pipe 76 is connected to a downstream side of the exhaust gas path 25 through a flange.

The injection nozzles 37 as injection portions are mounted on an upstream side of the NOx catalyst 62 and an upstream side of the slip processing catalyst 63 of one side surface of the purification casing 61. In the first embodiment, three injection nozzles 37 are mounted on the upstream side of the NOx catalyst 62 and three injection nozzles 37 are mounted on the upstream side of the slip processing catalyst 63 on the one side surface of the purification casing 61. A plurality of inspection windows 77 (three locations in first embodiment) are formed in the other side surface of the purification casing 61. Each of the inspection windows 77 is formed for inspection and maintenance of the interior of the purification casing 61, the injection nozzle 37, the NOx catalyst 62 and the slip processing catalyst 63. The inspection windows 77 are normally closed by lid covers 78 such that the inspection windows 77 can open and close. The lid covers 78 are detachably fastened to edges of the corresponding inspection windows 77 through mounting bolts.

When the purification-side switching valve 30 is opened and the bypass-side switching valve 31 is closed, exhaust gas in the exhaust gas path 25 passes through the purification path 28. That is, exhaust gas enters the purification casing 61 through the purification-side outlet 72 of the bifurcated pipe 71, the purification-side intake pipe 69 and the first exhaust gas inlet 67, the exhaust gas passes through the NOx catalyst 62 and the slip processing catalyst 63 and is purified. The purified exhaust gas enters the downstream side of the exhaust gas path 25 from the discharge port 75 of the outlet 66 of the purification casing 61 through the exhaust gas discharge pipe 76, and is discharged out from the purification casing 61 and the vessel 1.

When the bypass-side switching valve 31 is opened and the purification-side switching valve 30 are closed on the contrary, exhaust gas in the exhaust gas path 25 passes through the bypass path 29. That is, exhaust gas enters the purification easing 61 through the bypass-side outlet 73 of the bifurcated pipe 71, the bypass-side intake pipe 70 and the second exhaust gas inlet 68, bypasses the NOx catalyst 62 and the slip processing catalyst 63 and passes through the bypass path 29 without being purified. After the exhaust gas passes through the bypass path 29, the exhaust gas enters the downstream side of the exhaust gas path 25 from the discharge port 75 of the outlet 66 of the purification casing 61 through the exhaust gas discharge pipe 76, and the exhaust gas is discharged out from the purification casing 61 and the vessel 1.

Therefore, by switching operation of both the switching valves 30 and 31, it is possible to easily select the paths through which exhaust gas passes when the purification processing of exhaust gas is necessary (e.g., under sail in the regulated sea area) and when the purification processing of exhaust gas is unnecessary (e.g., under sail in a sea area other than the regulated sea area). Therefore, it is possible to efficiently purify exhaust gas in accordance with necessity and unnecessity of the purification processing. Further, both the switching valves 30 and 31 operate in the interlocking manner with each other and the valves 30 and 31 do not close at the same time. Therefore, it is possible to reliably prevent the exhaust gas path 25 from completely closing, or the fear of the complete close can largely be reduced.

(7). Operation and Effects

According to the above-described configuration, the exhaust gas purification device 27 is provided in the exhaust gas path 25 of the electric generating engine 12, and the exhaust gas purification device 27 includes the purification casing 61 accommodating therein at least the purification catalysts 62 and 63 which purify exhaust gas from the electric generating engine 12. The purification casing 61 is integrally provided with the bypass path 29 separately from the purification path 28 haying the purification catalysts 62 and 63. The bypass path 29 makes exhaust gas bypasses the purification catalysts 62 and 63 without passing through the purification catalysts 62 and 63. Therefore, when the purification processing of exhaust gas is necessary (under sail in the regulated sea area), exhaust gas is sent toward the purification path 28, and when the purification processing is unnecessary (under sail in a sea area other than the regulated sea area), exhaust gas is sent toward the bypass path 29. Therefore, it is possible to efficiently purify exhaust gas, and to elongate life of each of the purification catalysts 62 and 63.

Further, since the purification casing 61 is integrally provided with the bypass path 29, it is possible to shorten the length of the pipe of the bypass path 29, and to reduce the initial costs as compared with a case where the bypass path is separately provided outside the purification casing. Further, since the bypass path 29 is incorporated in the purification casing 61, the exhaust gas purification device 27 itself can be made compact, and the installation space of the exhaust gas purification device 27 can be made small.

Hence, it becomes easy to provide the exhaust gas purification device 27 in a narrow engine room in a vessel or the like.

The partition plate 64 extending in the discharging direction of exhaust gas partitions the interior of the purification casing 61 into the purification path 28 and the bypass path 29. Therefore, it is possible to form the two paths in the purification casing 61 only by a simple structure, i.e., only by adding the partition plate 64. Therefore, it is possible to reduce the producing costs of the exhaust gas purification device 27.

By partitioning the interior of the purification casing 61 by the partition plate 64, the purification catalysts 62 and 63 on the side of the purification path 28 are warmed up using heat of exhaust gas when the exhaust gas passes through the bypass path 29. Hence, it is possible to always warm up the purification catalysts 62 and 63 and to easily maintain the activated state irrespective of whether the exhaust gas should be purified. Since the warm up operation is unnecessary when exhaust gas passes through the purification path 28, it is possible to swiftly purify exhaust gas.

Further, since the purification path 28 and the bypass path 29 merge with each other in the outlet 66 of the purification casing 61, both exhaust gas which passes through the purification path 28 and is purified and exhaust gas which passes through the bypass path 29 can be sent to the downstream of the exhaust gas path 25 which is connected to the outlet 66 of the purification casing 61. Therefore, it is possible to simplify the exhaust structure and to reduce the initial costs.

Further, since the branch portion 71 between the purification path 28 and the bypass path 29 is provided with the path-switching members 30 and 31 which switch the discharging direction of exhaust gas between the purification path 28 and the bypass path 29, it is possible to easily select the paths 28 and 29 through which exhaust gas passes when the purification processing of exhaust gas is necessary under sail in the regulated sea area) and when the purification processing is unnecessary (e.g., under sail in a sea area other than the regulated sea area). Therefore, it is possible to efficiently purify exhaust gas in accordance with necessity and unnecessity of the purification processing. Especially, the path-switching valves 30 and 31 close only one of the purification path 28 and the bypass path 29, and do not close both the purification path 28 and the bypass path 29 at the same time. Therefore, it is possible to reliably prevent the exhaust gas path 25 from completely closing, or the fear of the complete close can largely be reduced. Further, the path-switching members (both switching valves 30 and 31) are connected to each other in the interlocking manner through the link mechanism 110 such that if one of them opens, the other one closes, and the drive mechanism for opening and closing operation is connected to one of the switching valves 30 and 31. Therefore, the fear of the complete close can largely be reduced, the two switching valves 30 and 31 can be opened and closed by the one drive mechanism, and the structure can be simplified.

The ejecting nozzles 37 which spray gas to the purification catalysts 62 and 63 are provided upstream of the purification catalysts 62 and 63 in the purification casing 61. Therefore, by the operation of the ejecting nozzle 37, it is possible to forcibly remove soot and dust accumulated in the purification catalysts 62 and 63 during usage, and it is possible to enhance the maintenance operability and to elongate the life of the exhaust gas purification device 27.

Further, when exhaust gas passes through the bypass path 29, if injection of compression gas from the injection nozzle 37 is stopped, it is unnecessary to uselessly spray gas to the purification catalysts 62 and 63 when exhaust gas does not pass through the purification path 28. Therefore, a consumption amount of gas to be sprayed to the purification catalysts 62 and 63 can be reduced, and the running costs can be reduced.

The exhaust gas purification device includes the reducing agent supply portion 47 for supplying reducing agent to reduce NOx, and when exhaust gas passes through the bypass path 29, supply of the reducing agent from the reducing agent supply portion 47 is stopped. Therefore, when purification processing is unnecessary (e.g., under sail in a sea area other than the regulated sea area), the reducing agent is not uselessly consumed. It is possible to efficiently supply the reducing agent in accordance with necessity and unnecessity of the purification processing.

From the generated electric power amount detected by the electric power transducer 15, it is possible to grasp concentration of NOx in exhaust as and a urea water supply amount (reducing agent supply amount) which is necessary for reducing NOx. Therefore, an appropriate amount of urea water suitable for the concentration of NOx in exhaust gas can be supplied to the exhaust gas path 25. Therefore, it is possible to efficiently break down NOx in exhaust gas into nitrogen and water by the operation of the NOx catalyst 62 in the post-processing device 27. Since an appropriate amount of urea water suitable for concentration of NOx in exhaust gas is supplied to the exhaust gas path 25, it is possible to suppress ammonia slip which discharges unreacted (excessive) ammonia to outside.

The slip processing catalyst 63 which facilitates oxidation treatment of excessively supplied reducing agent (ammonia after hydrolysis) is placed at a location, downstream of the NOx catalyst 62 in the purification casing 61 accommodating the NOx catalyst 62 therein. Therefore, excessive reducing agent which tries to pass through the NOx catalyst 62 while keeping the unreacted state can be oxidized into nitrogen and it is possible to render the reducing agent harmless, and it is possible to reliably prevent ammonia from remaining in exhaust gas. The NOx catalyst 62 and the slip processing catalyst 63 can be packaged, and the downstream side of the exhaust structure can be made compact.

Further, the electric power transducer 15 as the NOx detecting means detects the generated electric power amount of the electricity generator 13, and concentration of NOx in exhaust gas is indirectly obtained based on the detection result of the electric power transducer 15. Therefore, a sensor for exclusive use to detect concentration of NOx is unnecessary, and it is possible to simplify the structure and to reduce the producing costs.

(8). Post-Processing Device of Second Embodiment

Figure 6:
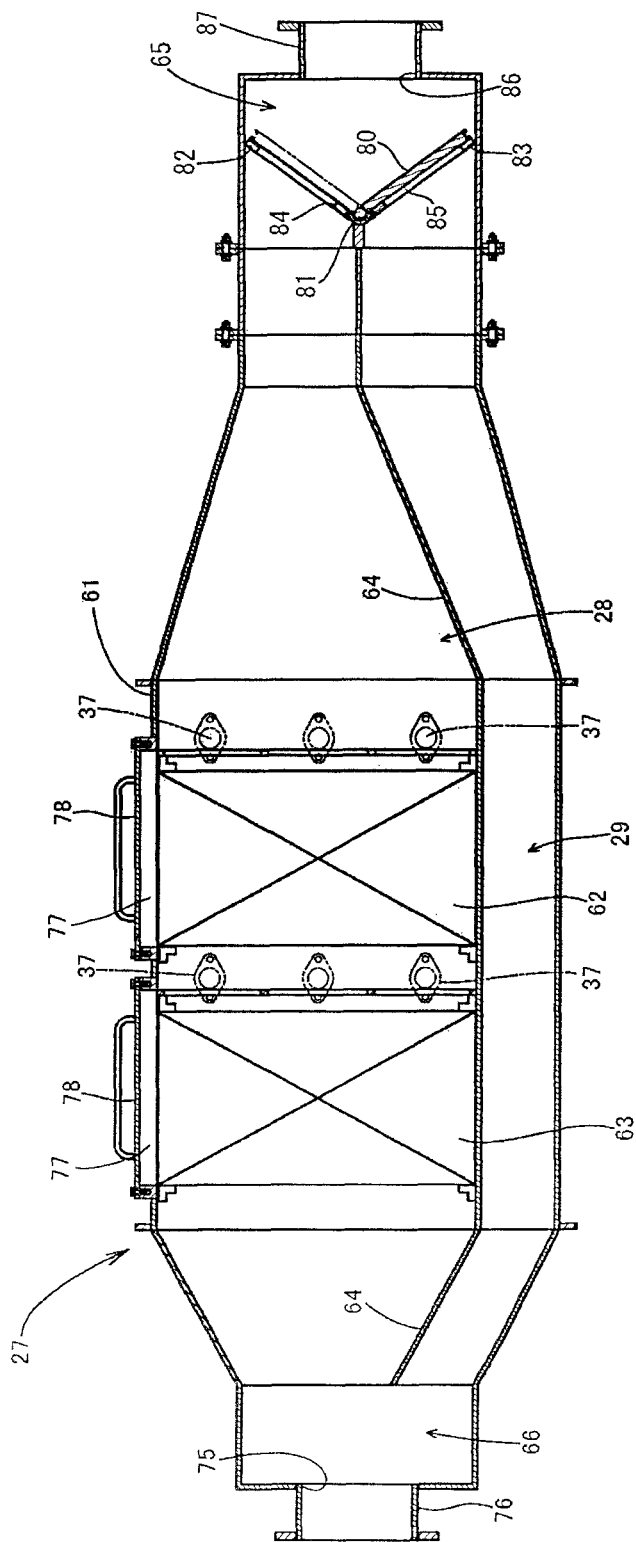
FIG. 6 is a sectional side view of a post-processing device in a second embodiment.

Next, a post-processing device 27 of a second embodiment will be described with reference to FIG. 6. In the second embodiment and a subsequent embodiment, the same reference signs as those of the first embodiment are allocated to members having the same configurations and operations as those of the first embodiment, and detailed description thereof will be omitted. The second embodiment is different from the first embodiment in that a branch portion between the purification path 28 and the bypass path 29 is provided with a gas operating type swing valve 80 as a path-switching member. The swing valve 80 opens one of an inlet side of the purification path 28 and an inlet side of the bypass path 29, and closes the other inlet side.

In this case, an upstream end of the partition plate 64 discontinues in the inlet 65 located upstream of the NOx catalyst 62 of the purification casing 61. A turning fulcrum shaft 81 of the swing valve 80 is turnably supported on the upstream end of the partition plate 64. An inlet 65 of a purification casing is provided with a first inlet plate 82 having a purification inlet 84 which is in communication with the purification path 28, and with a second inlet plate 83 having a bypass inlet 85 which is in communication with the bypass path 29. The first inlet plate 82 is placed on the side of the inlet of the purification path 28, and the second inlet plate 83 is placed on the side of the inlet of the bypass path 29. By turning motion around the turning fulcrum shaft 81, the swing valve 80 comes into tight contact with a front surface side of the first inlet plate 82 to close the purification inlet 84, or comes into tight contact with a front surface side of the second inlet plate 83 to close the bypass inlet 85. An introducing port 86 is formed in a front surface of the inlet 65 of the purification casing 61. A front outer surface of the inlet 65 is provided with an exhaust gas intake pipe 87 which is in communication with the introducing port 86. The exhaust gas intake pipe 87 is connected to an upstream side of the exhaust gas path 25 through a flange. Other structure is the same as that of the first embodiment.

In a state where the swing valve 80 closes the bypass inlet 85, exhaust gas in the exhaust gas path 25 passes through the purification path 28. That is, exhaust gas passes through the NOx catalyst 62 and the slip processing catalyst 63 in the post-processing device 27 (purification casing 61) and is purified and then, is discharged to outside of the vessel 1. In a state where the swing valve 80 closes the purification inlet 84, exhaust gas in the exhaust gas path 25 bypasses the NOx catalyst 62 and the slip processing catalyst 63, passes through the bypass path 29 without being purified, and is discharged to outside of the vessel 1.

According to the above configuration also, it is possible to easily select the paths through which exhaust gas passes when the purification processing of exhaust gas is necessary (e.g., under sail in the regulated sea area) and when the purification processing is unnecessary (e.g., under sail in a sea area other than the regulated sea area), and the same working effect as that of the first embodiment can he obtained.

(9). Post-Processing Device of Third Embodiment

Next, a structure of a post-processing device 27 of a third embodiment will be described with reference to FIG. 7. The third embodiment is different from the first embodiment in that the branch portion between the purification path 28 and the bypass path 29 is provided with a gas-operating type swing valve 90 as a path-switching member.

On a front surface of the inlet 65 of the purification casing 61, the first exhaust gas inlet 67 is formed at a location close to the purification path 28, and the second exhaust gas inlet 68 is formed at a location close to the bypass path 29. An outer surface of the front portion of the inlet 65 is provided with the purification-side intake pipe 69 which is in communication with the first exhaust gas inlet 67 and a bypass-side intake pipe 70 which is in communication with the second exhaust gas inlet 68. A substantially box-shaped swing valve accommodating portion 92 is placed in front of the purification-side intake pipe 09 and the bypass-side intake pipe 70.

A first exhaust gas outlet 93 and a second exhaust gas outlet 94 are formed on the side of a rear surface of the swing valve accommodating portion 92. An outer surface of the rear portion of the swing valve accommodating portion 92 is provided with a purification-side pipe 95 which is in communication with the first exhaust gas outlet 93 and a bypass-side pipe 94 which is in communication with the second exhaust gas outlet 94. The purification-side pipe 95 of the swing valve accommodating portion 92 is connected to the purification-side intake pipe 69 of the purification casing 61 through a relay pipe 97. The bypass-side pipe 96 of the swing valve accommodating portion 92 is connected to the bypass-side intake pipe 70 of the purification casing 61 through a relay pipe 98.

A turning fulcrum shaft 91 of the swing valve 90 is turnably supported in the swing valve accommodating portion 92. A first inlet plate 102 having a purification inlet 104 which is in communication with the purification-side pipe 95 and a second inlet plate 103 having a bypass inlet 105 which is in communication with the bypass-side pipe 96 are provided in the swing valve accommodating portion 92. The first inlet plate 102 is opposed to the first exhaust gas outlet 93, and the second inlet plate 103 is placed such that it laterally partitions an interior of the swing valve accommodating portion 92. By turning motion around the turning fulcrum shaft 91, the swing valve 90 comes into tight contact with a front surface side of the first inlet plate 102 to close the purification inlet 104, or comes into tight contact with one side surface side of the second inlet plate 103 to close the bypass inlet 105.

An introducing port 106 is formed in a front surface of the swing valve accommodating portion 92 at a location close to the purification path 28. A front outer surface of the swing valve accommodating portion 92 is provided with an exhaust gas intake pipe 107 which is in communication with the introducing port 106. The exhaust gas intake pipe 107 is connected to an upstream side of the exhaust gas path 25 through a flange. Other configuration is the same as that of the first embodiment.

In a state where the swing valve 90 closes the bypass inlet 105, exhaust gas in the exhaust gas path 25 passes through the purification path 28. That is, exhaust gas passes through the NOx catalyst 62 and the slip processing catalyst 63 in the post-processing device 27 (purification casing 61), the exhaust gas is purified and then is discharged to outside of the vessel 1. In a state where the swing valve 90 closes the purification inlet 104, exhaust gas in the exhaust gas path 25 bypasses the NOx catalyst 62 and the slip processing catalyst 63, passes through the bypass path 29 without being purified, and the exhaust gas is discharged to outside of the vessel 1.

According to the above configuration also, it is possible to easily select the paths through which exhaust gas passes when the purification processing of exhaust gas is necessary (e.g., under sail in the regulated sea area) and when the purification processing is unnecessary (e.g., under sail in a sea area other than the regulated sea area), and the same working effect as that of the first embodiment can be obtained.

Configurations of the various portions are not limited to the illustrated embodiments, and the configurations can variously be modified within a range not departing from the subject matters of the invention of the present application. Although the invention of the present application is applied to the exhaust gas purification device 27 provided in the exhaust gas path 25 of the electric generating engine 12, the invention is not limited to this, and the invention may be applied to an exhaust gas purification device in an exhaust system of the main engine 8 for example.

REFERENCE SIGNS LIST

1 Vessel
12 Electric generating diesel engine
25 Exhaust gas path

27 Post-processing device (exhaust gas purification device)
28 Purification path
29 Bypass path
30 Purification side switching valve
31 Bypass-side switching valve
61 Purification casing
62 NOx catalyst
63 Slip processing catalyst
64 Partition plate
71 Bifurcated pipe
80, 90 Swing valve

The invention claimed is:

1. An exhaust gas purification device provided in an exhaust gas path of an engine, wherein
the exhaust gas purification device comprises a purification casing in which at least a purification catalyst for purifying exhaust as from the engine is accommodated,
the interior of the purification casing is partitioned by a partition plate extending in a discharging directions of the exhaust gas into a purification path having the purification catalyst and a bypass path witch is configured to cause the exhaust gas to bypass the purification catalyst without passing through the purification catalyst,
the purification path and the bypass path merge with each other at the outlet of the purification casing,
the purification casing has an inspection window at a position directly opposed to the purification catalyst and a dimension of the inspection window in an axial direction of the purification casing is substantially coextensive with a dimension of the purification catalyst in said axial direction of the purification casing whereby the purification catalyst is subject to visual inspection from one of its axial extremities to the other to facilitate maintenance of the purification catalyst, and
the inspection window is provided with a lid cover configured to open and close the window.

2. The exhaust gas purification device according to claim 1, wherein by partitioning the interior of the purification casing by the partition plate, the purification catalyst on a side of purification path is warmed up using heat of the exhaust gas where the exhaust gas passes through the bypass path.

3. The exhaust gas purification device according to claim 1, wherein a branch portion between the purification path and the bypass path is provided, with a path-switching member for switching the discharging direction of the exhaust gas between the purification path and the bypass path.

4. The exhaust gas purification device according to claim 3, wherein the path-switching member comprises switching valves respectively provided in an inlet side of the purification path and in an inlet side of the bypass path, and if one of the switching valves opens, the other switching valve closes.

5. The exhaust gas purification device according to claim 4, wherein both the switching valves are connected to each other in an interlocking manner through a link mechanism such that if one of the switching valves opens, the other switching valve closes, and a drive mechanism for an opening and closing operation is connected to one of the switching valves.

6. The exhaust gas purification device according to claim 3, wherein the path-switching member comprises a swing valve configured such that if the swing valve opens one of an inlet side of the purification path and an inlet side of the bypass path, the switching valve closes the other inlet side.

7. The exhaust gas purification device according to claim 1, wherein injection of compression gas from an injecting portion into the purification casing is stopped when the exhaust gas passes through the bypass path.

8. The exhaust gas purification device according to claim 1, further comprising a reducing agent supply portion for supplying NOx-reducing agent to the exhaust gas, wherein supply of the reducing agent from the reducing agent supply portion is stopped when the exhaust gas passes through the bypass path.

* * * * *